(12) United States Patent
Chiang

(10) Patent No.: US 7,876,306 B2
(45) Date of Patent: Jan. 25, 2011

(54) MOUSE WITH TILT WHEEL ENCODING MECHANISM

(75) Inventor: Hsiao-Lung Chiang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 930 days.

(21) Appl. No.: 11/686,785

(22) Filed: Mar. 15, 2007

(65) Prior Publication Data

US 2008/0174555 A1    Jul. 24, 2008

(30) Foreign Application Priority Data

Jan. 19, 2007    (TW) ............................... 96102019 A

(51) Int. Cl.
G06F 3/033    (2006.01)
G09G 5/00    (2006.01)

(52) U.S. Cl. .................. 345/163; 345/156; 345/684

(58) Field of Classification Search ......... 345/156–167, 345/684–687; 463/37–38; 273/148 B; 715/784–785
See application file for complete search history.

(56) References Cited

U.S. PATENT DOCUMENTS 7,295,185 B2 *    11/2007    Wang .......................... 345/164
2006/0022944 A1 *    2/2006    Pai .............................. 345/163
2006/0290655 A1 *    12/2006    Chou .......................... 345/156

* cited by examiner

Primary Examiner—Bipin Shalwala
Assistant Examiner—Sosina Abebe
(74) Attorney, Agent, or Firm—Apex Juris, pllc; Tracy M Heims

(57) ABSTRACT

The present invention relates to a mouse device having a tilt wheel encoding mechanism. The tilt wheel encoding mechanism includes a scroll wheel, a wheel carrier and a multi-direction switch unit. The scroll wheel is operable by a user. The wheel carrier has a receptacle for receiving the scroll wheel therein such that the scroll wheel is rotatable in the receptacle. By using the multi-direction switch unit to generate plural triggering signals, this encoding mechanism is simplified.

4 Claims, 6 Drawing Sheets

MOUSE WITH TILT WHEEL ENCODING MECHANISM

FIELD OF THE INVENTION

The present invention relates to a mouse having a wheel mechanism, and more particularly to a mouse having a tilt wheel encoding mechanism.

BACKGROUND OF THE INVENTION

An input device such as a mouse or a keyboard has been widely employed in a computer system for scrolling images shown on the display screen upwardly and downwardly. For example, by rotating a scroll wheel of the input device forwardly or backwardly, a specified control signal is generated to control the scrolling operations of web pages. In addition to the vertical scroll movement, it is important to achieve the horizontal scroll movement. For example, since the texts or graphs shown in the graphic-based window of the display screen usually fail to be fully browsed, the horizontal scroll movement is required to move the web page or the document in the left or right direction so as to display the desired image as required.

For facilitating a user to perform the horizontal scroll movement of the web pages shown on the display screen by operating the scroll wheel, a tilt scroll wheel module capable of being tilted leftwards or rightwards is developed. Such tilt scroll wheel module is applicable to an input device such as a mouse or a keyboard. Referring to FIG. 1, a schematic outward view of a mouse having a tilt scroll wheel module is illustrated. The tilt scroll wheel module 11 of the mouse 1 is positioned within an opening 101 of the main body 10 of the mouse 1, and the scroll wheel 12 is partially protruded from the outer surface of the main body 10 such that the tilt scroll wheel module 11 can be manipulated by a user. The scroll wheel 12 of the tilt scroll wheel module 11 can be rotated forwardly (as shown in the arrow F) or backwardly (as shown in the arrow B) to generate a control signal, thereby scrolling the image shown on the display screen upwardly and downwardly. Furthermore, the scroll wheel 12 can be pressed down (as shown in the arrow D), tilted toward the left side (as shown in the arrow L) or tilted toward the right side (as shown in the arrow R) so as to generate three other control signals.

Referring to FIG. 2, a schematic perspective view of the tilt scroll wheel module used in the tilt scroll wheel module of FIG. 1 is illustrated. The tilt scroll wheel module 11 principally comprises a scroll wheel 12, a rotating shaft 13, a carrier member 14 and a supporting member 15. The supporting member 15 has a receptacle 151 at the top side thereof. In addition, three switch units 16A, 16B and 16C are arranged under the bilateral sides of the carrier member 14 and under the rear end of the carrier member 14, respectively. The rotating shaft 13 is supported on a notch structure 141 of the carrier member 14, so that the scroll wheel 12 is rotatable along the rotating shaft 13.

Please refer to FIG. 2 again. The tilt scroll wheel module 11 further comprises lateral wing structures 142A and 142B at bilateral sides of the carrier member 14 and above the switch units 16A and 16B, respectively. In addition, the front and rear ends of the carrier member 14 are formed as protrusion rods 143A and 143B. The protrusion rod 143A is movably supported on the receptacle 151 of the supporting member 15. Whereas, the protrusion rod 143B is placed on the top surface of the switch unit 16C. In a case that the scroll wheel 12 is tilted toward the left or right side, the receptacle 151 of the supporting member 15 and the top surface of the switch unit 16C are used as the fulcrum portions such that the carrier member 14 is movable in the left or right direction. Meanwhile, the lateral wing structure 142A or 142B will touch and trigger the switch unit 16A or 16B. In addition, in a case that the scroll wheel 12 is pressed down, the receptacle 151 of the supporting member 15 is served as the fulcrum portion such that the protrusion rod 143B is moved downwardly to trigger the switch unit 16C.

The tilt scroll wheel module 11 mentioned above, however, still has some problems. For example, in the case that the scroll wheel 12 is not enabled, the protrusion rod 143B of the carrier member 14 is slightly in contact with the top surface of the switch unit 16C but the switch unit 16C is not triggered. If the scroll wheel 12 is pressed down, the switch unit 16C may be triggered by the protrusion rod 143B of the carrier member 14. Unfortunately, the depressing force applied onto the scroll wheel 12 is likely to improperly swing toward the left or right side due to a slippery hand or other reasons. Under this circumstance, the lateral wing structure 142A or 142B is likely to touch and trigger the switch unit 16A or 16B. As a consequence, the mouse 1 is suffered from an erroneous operation such as interruption of a current control signal or generation of an unanticipated control signal.

For solving the above problems, an input device with a tilt scroll wheel module was disclosed in a co-pending Taiwanese Patent Application No. 95100875, which was filed by the same assignee of the present application on Jan. 10, 2006, and the contents of which are hereby incorporated by reference.

Referring to FIG. 3, a schematic perspective view of the tilt scroll wheel module disclosed in Taiwanese Patent Application No. 95100875 is illustrated. In accordance with a feature of FIG. 3, the tilt scroll wheel module 21 further includes two confining members 27 and 28 for confining the carrier member 24 in position. The confining members 27 and 28 have complementary shapes. Due to the complementary shapes, the confining member 27 is shifted downwardly to be engaged with the confining member 28 while the scroll wheel 22 is pressed down to trigger the switch unit 26C. Therefore, the carrier member 24 is confined in position so as to avoid improperly swinging the carrier member 24 toward the left or right side or otherwise allow for tiny swing of the carrier member 24. Under this circumstance, the carrier member 24 will no longer trigger the switch unit 26A or 26B while the scroll wheel 22 is pressed down to trigger the switch unit 26C. Until the depressing force applied onto the scroll wheel 22 is eliminated, the scroll wheel 22 is moved upwardly and returns to its original shape due to a restoring force generated from the compressed switch unit 26C. Meanwhile, the confining member 27 is disengaged from the confining member 28, so that the carrier member 24 can be tilted toward the left or right side as required.

The tilt scroll wheel module 21 of FIG. 3 is effective for solving the problem occurred in the tilt scroll wheel module 11 of FIG. 2. However, there are still some drawbacks. For example, since two switch units are arranged at the bilateral sides of the scroll wheel and associated triggering components are required to trigger these two switch units, the volume thereof occupies much working space within the mouse and is adverse to space utilization. In addition, too many components increase the assembling time of mounting the switch units and the triggering components onto the proper positions of the mouse.

Therefore, there is a need of providing a mouse having a simplified tilt wheel encoding mechanism.

SUMMARY OF THE INVENTION

It is an object of the present invention to provide a mouse having a tilt wheel encoding mechanism by using a multi-direction switch unit, so that the tilt wheel encoding mechanism is simple in the structure and easily assembled.

In accordance with an aspect of the present invention, there is provides a mouse device. The mouse device includes a main body and a tilt wheel encoding mechanism. The main body includes a base. The tilt wheel encoding mechanism includes a scroll wheel, a wheel carrier and a multi-direction switch unit. The scroll wheel is operable by a user. The wheel carrier includes a first end, a second end, a triggering arm adjacent to the second end, a first support part arranged on the base for supporting the first end, a second support part arranged on the base for supporting the second end, and a receptacle for receiving the scroll wheel therein such that the scroll wheel is rotatable in the receptacle. The triggering arm further includes an indentation. The multi-direction switch unit is disposed under the triggering arm and includes a triggering button, which is embedded into the indentation.

In an embodiment, the wheel carrier further includes two sidewalls cooperatively defining a receptacle for receiving the scroll wheel therein.

In an embodiment, the wheel carrier further includes a wheel carrier axle protruded from the first end thereof, and the first support part is a support plate having a notch for receiving the wheel carrier axle therein.

In an embodiment, the wheel carrier further includes a vertical support plate at the second end thereof, and the second support part includes a confining recess for receiving the vertical support plate therein.

Preferably, the multi-direction switch unit is a three-direction switch.

Preferably, the multi-direction switch unit is a five-direction switch.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
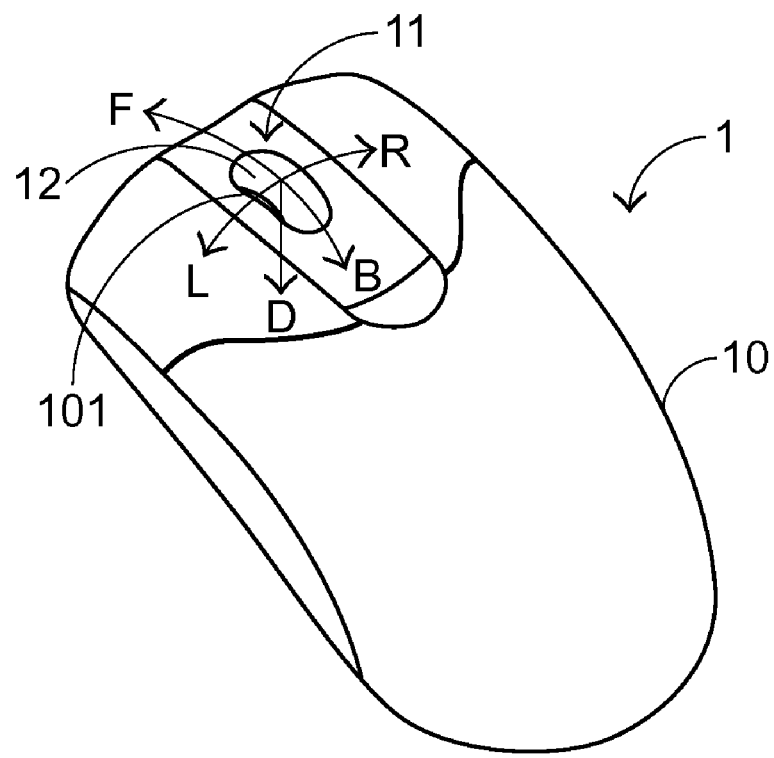
FIG. 1 is a schematic outward view of a mouse having a tilt scroll wheel module according to prior art.
Figure 2:
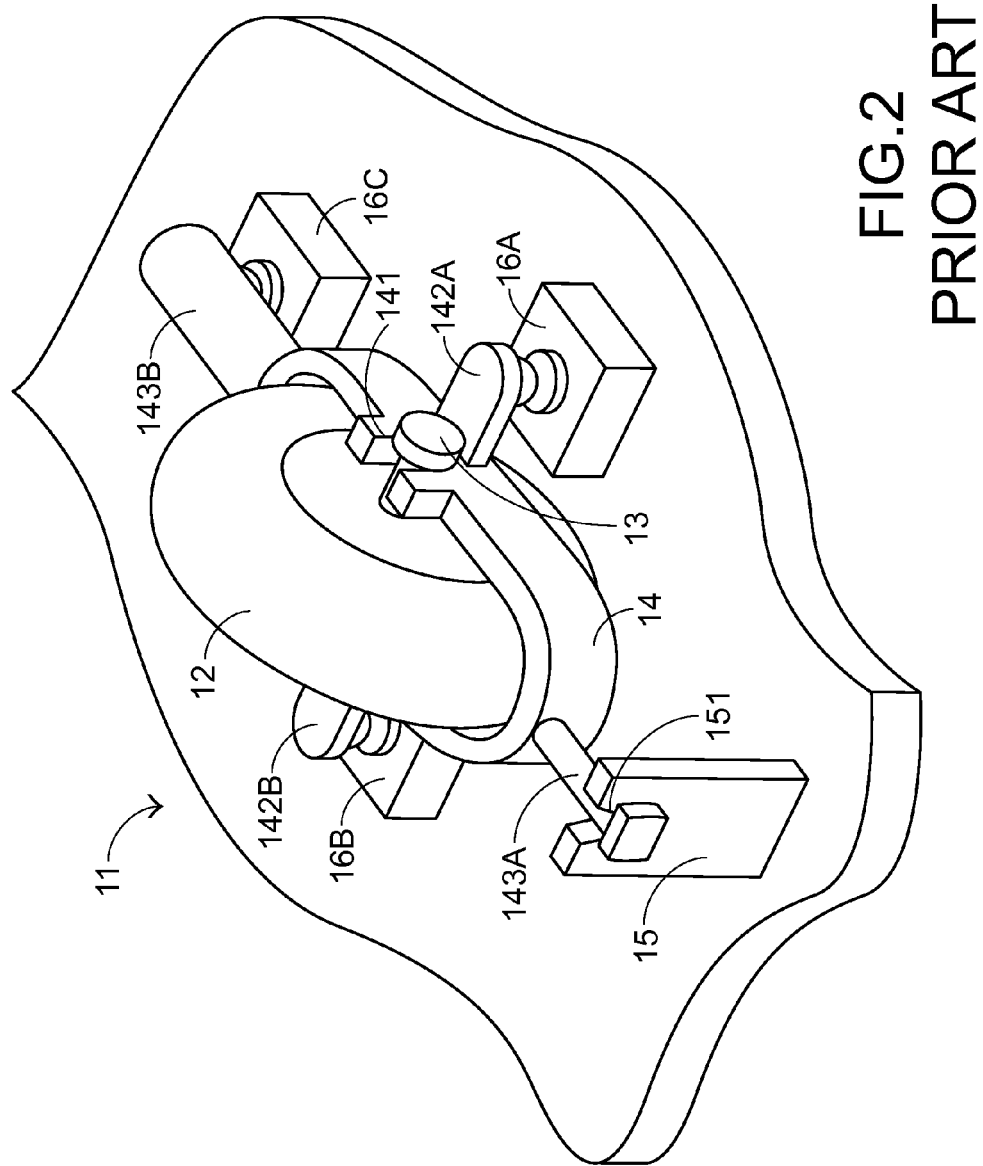
FIG. 2 is a schematic perspective view of the tilt scroll wheel module of the mouse in FIG. 1.
Figure 3:
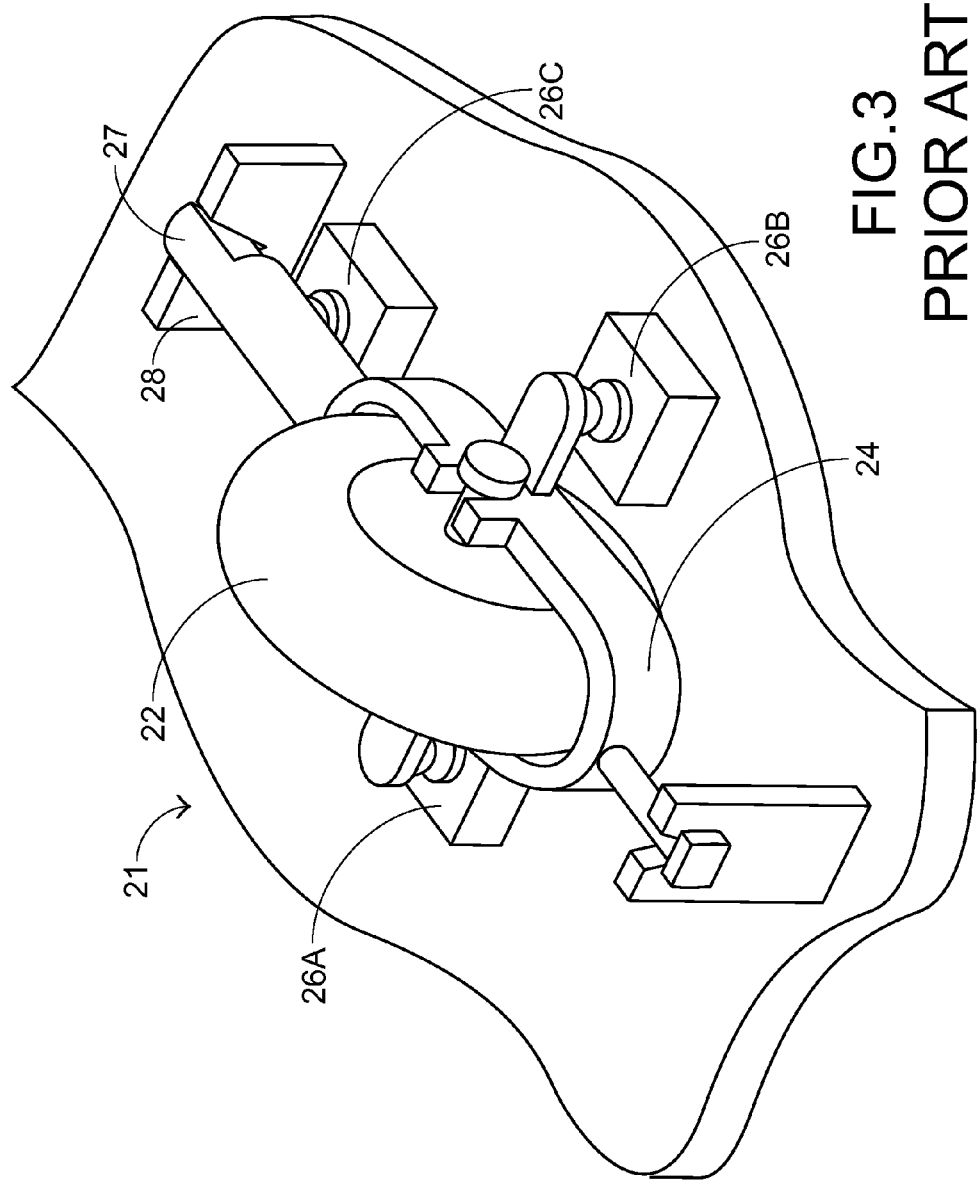
FIG. 3 is a schematic perspective view of the tilt scroll wheel module disclosed in Taiwanese Patent Application No. 95100875.
Figure 4:
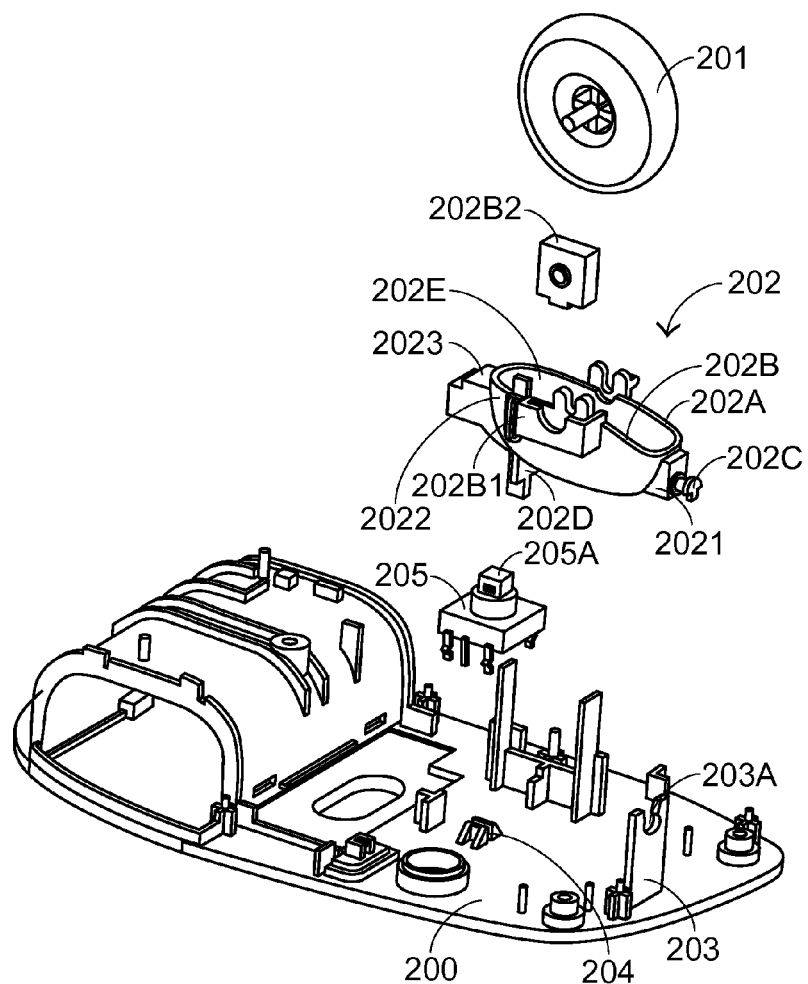
FIG. 4 is a schematic exploded view of a mouse having a tilt wheel encoding mechanism according to a preferred embodiment of the present invention.

Referring to FIG. 4, a schematic exploded view of a mouse having a tilt wheel encoding mechanism according to a preferred embodiment of the present invention is illustrated.

Figure 6:
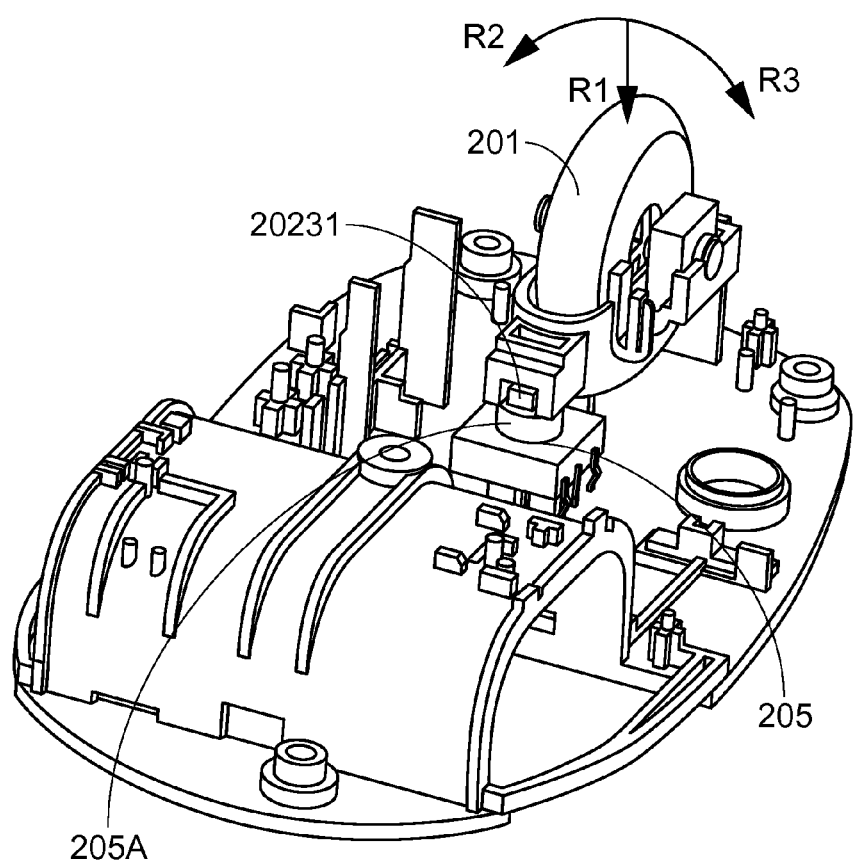
FIG. 6 is a schematic assembled view of the tilt wheel encoding mechanism of the present invention.

The mouse of FIG. 4 principally includes a base 200, a scroll wheel 201, a wheel carrier 202, a first support part 203, a second support part 204 and a multi-direction switch unit 205. The wheel carrier 202 includes a first sidewall 202A, a second sidewall 202B, a first end 2021, a second end 2022 and a triggering arm 2023. The triggering arm 2023 has an indentation 20231, as is shown in FIG. 6.

Please refer to FIG. 4 again. A wheel carrier axle 202C is protruded from the first end 2021 of the wheel carrier 202. The first support part 203 is a support plate having a notch 203A. The wheel carrier 202 further includes a vertical support plate 202D at the second end 2022. The second support part 204 is a confining recess formed in the base 200.

Hereinafter, the structure and the operation of the encoding mechanism will be illustrated as follows.

First of all, the scroll wheel 201 is partially received within a receptacle 202E between the first sidewall 202A and the second sidewall 202B. Then, the wheel carrier axle 202C at the first end 2021 of the wheel carrier 202 is received in the notch 203A of the first support part 203, and the vertical support plate 202D at the second end 2022 of the wheel carrier 202 is received in the confining recess 204. In addition, an encoder receiving structure 202B1 is extended from a second sidewall 202B1 of the wheel carrier 202 for accommodating a mechanical encoder 202B2 therein.

The multi-direction switch unit 205 is arranged on a circuit board (not shown) and includes a triggering button 205A. The triggering button 205A is received within the indentation 20231 of the triggering arm 2023.

Figure 5A:
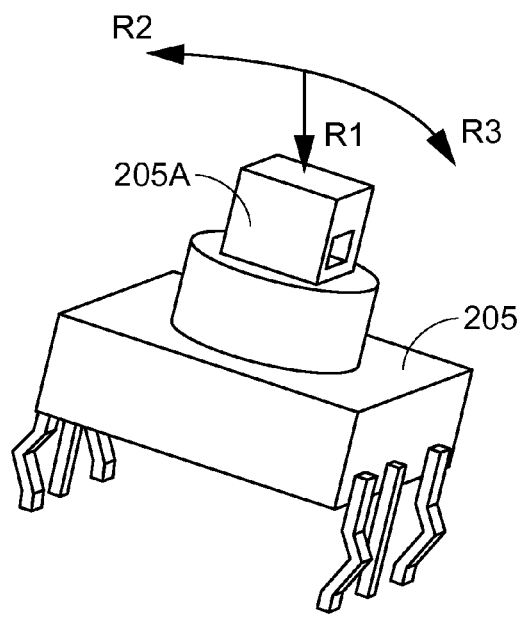
FIG. 5A is a schematic perspective view of a three-direction switch.
Figure 5B:
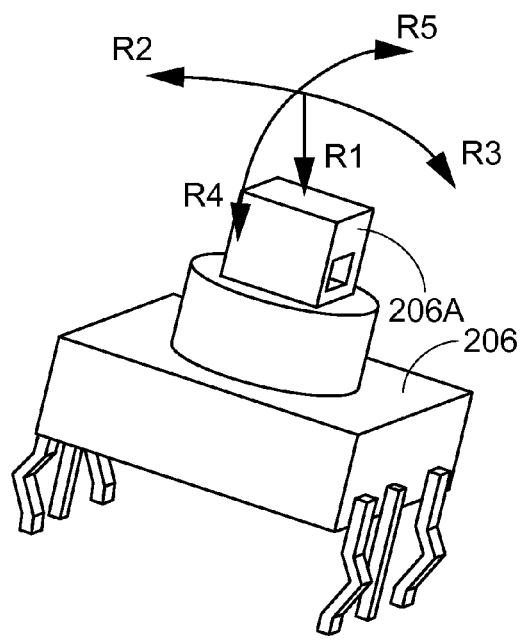
FIG. 5B is a schematic perspective view a five-direction switch.

Referring to FIGS. 5A and 5B, two examples of the multi-direction switch unit 205 are schematically illustrated. In FIG. 5A, the multi-direction switch unit 205 is a three-direction switch. In FIG. 5B, the multi-direction switch unit 206 is a five-direction switch. As shown in FIG. 5A, three triggering signals are generated when the triggering button 205A of the three-direction switch 205 is triggered. That is, in response to external forces exerting on the triggering button 205A as shown in the arrows R1, R2 and R3, first, second and third triggering signals are respectively generated. Until the external force applied onto the triggering button 205A is eliminated, the triggering button 205A returns to its original position. As previously described, the conventional switch unit is triggered to generate a triggering signal. In contrast, a single three-direction switch 205 can be triggered to generate three triggering signals. Likewise, as shown in FIG. 5B, five triggering signals are generated when the triggering button 206A of the five-directional switch 206 is triggered. That is, in response to external forces exerting on the triggering button 206A as shown in the arrows R1, R2, R3, R4 and R5, five triggering signals are respectively generated.

Referring to FIG. 6, a schematic assembled view of the mouse shown in FIG. 4 is illustrated. Hereinafter, the structure and the operations of the tilt wheel encoding mechanism will be illustrated with reference to FIG. 4, and FIG. 6.

First of all, the scroll wheel 201 is partially received within the receptacle 202E between the first sidewall 202A and the second sidewall 202B, and a portion of the scroll wheel 201 is protruded from the outer surface of the main body such that the scroll wheel 201 can be manipulated by a user.

When the scroll wheel 201 is rotated, the mechanical encoder 202B2 within the encoder receiving structure 202B1 will generate a third axle signal to control image scrolling. When the scroll wheel 201 is pressed down to have the wheel carrier 202 move downwardly, the triggering arm 2023 of the wheel carrier 202 will touch the triggering button 205A of the three-directional switch 205. Meanwhile, the triggering button 205A is triggered in response to the external force along the direction R1, thereby generating the fist triggering signal. When the scroll wheel 201 is tilted toward the left side in the direction R2, the wheel carrier 202 is swung toward the left side in the direction R2 in a swing radius D equivalent to the distance between the confining recess 204 and the triggering arm 2023 and with the confining recess 204 serving as a fulcrum. Meanwhile, the triggering button 205A is also tilted toward the left side in the direction R2 to generate the second triggering signal because the triggering button 205A of the multi-direction switch unit 205 is embedded into the indentation 20231 of the triggering arm 2023. Similarly, when the scroll wheel 201 is tilted toward the right side in the direction R3, the triggering button 205A is also tilted toward the right side in the direction R3 to generate the third triggering signal.

The magnitude of the swing radius D indicates the degree of tilting the wheel carrier 202 to trigger the multi-direction switch unit 205. For example, if the encoding mechanism has a larger swing radius D1 (i.e. D1>D), a smaller degree of tilting the wheel carrier 202 is required to trigger the multi-direction switch unit 205.

Likewise, by operating the scroll wheel 201, five triggering signals are generated when the triggering button 206A of the five-direction switch 206 is triggered.

From the above description, the tilt wheel encoding mechanism according to the present invention has functions similar to the conventional tilt scroll wheel module by using a single multi-direction switch unit. Moreover, the problems of using three switch units will be solved so as to avoid an erroneous operation.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device comprising:
  a main body including a base;
  a tilt wheel encoding mechanism including:
    a scroll wheel operable by a user;
    a wheel carrier including a first end, a second end, a triggering arm adjacent to said second end, a first support part arranged on said base for supporting said first end, a second support part arranged on said base for supporting said second end, and a receptacle for receiving said scroll wheel therein such that said scroll wheel is rotatable in said receptacle, wherein said triggering arm further includes an indentation;
    wherein said wheel carrier further includes a wheel carrier axle protruded from said first end thereof, and said first support part is a support plate having a notch for receiving said wheel carrier axle therein;
    wherein said wheel carrier further includes a vertical support plate at said second end thereof, and said second support part includes a confining recess for receiving said vertical support plate therein; and
    a multi-direction switch unit disposed under said triggering arm and including a triggering button, which is embedded into said indentation.

2. The mouse device according to claim 1 wherein said wheel carrier further includes two sidewalls cooperatively defining said receptacle for receiving said scroll wheel therein.

3. The mouse device according to claim 1 wherein said multi-direction switch unit is a three-direction switch.

4. The mouse device according to claim 1 wherein said multi-direction switch unit is a five-direction switch.

* * * * *